(12) United States Patent
Blevis

(10) Patent No.: US 7,453,068 B2
(45) Date of Patent: Nov. 18, 2008

(54) METHOD AND APPARATUS OF DETECTING IONIZING RADIATION

(75) Inventor: Ira Blevis, Zichron Yaakov (IL)

(73) Assignee: GE Medical Systems Israel, Ltd., Tirat Hacarmel (IL)

(*) Notice: Subject to any disclaimer, the term of this patent is extended or adjusted under 35 U.S.C. 154(b) by 573 days.

(21) Appl. No.: 11/175,695

(22) Filed: Jul. 6, 2005

(65) Prior Publication Data

US 2007/0007457 A1    Jan. 11, 2007

(51) Int. Cl.
H01L 27/146    (2006.01)
G01T 1/24    (2006.01)

(52) U.S. Cl. .......................... 250/370.13; 250/370.09; 250/370.01

(58) Field of Classification Search ............ 250/370.13, 250/370.01, 370.09
See application file for complete search history.

(56) References Cited

U.S. PATENT DOCUMENTS

| | | | |
|---|---|---|---|
| 5,677,539 A | 10/1997 | Apotovsky et al. | |
| 6,002,134 A | 12/1999 | Lingren | |
| 6,037,595 A | 3/2000 | Lingren | |
| 6,046,454 A | 4/2000 | Lingren et al. | |
| 6,169,287 B1 * | 1/2001 | Warburton | 250/370.1 |
| 6,218,668 B1 | 4/2001 | Luke | |
| 6,333,504 B1 | 12/2001 | Lingren et al. | |
| 6,528,797 B1 | 3/2003 | Benke et al. | |
| 6,553,092 B1 | 4/2003 | Mattson et al. | |
| 6,727,505 B2 | 4/2004 | Benke et al. | |
| 7,141,797 B2 * | 11/2006 | Yokoi et al. | 250/370.1 |

OTHER PUBLICATIONS

Doty, F.P. et al.; Pixellated CdZnTe Detector Arrays; Nuclear Instruments and Methods in Physics Research A 353 (1994) 356-360.
Lachis, Uri; CdTe Semiconductor Gamma Radiation Detectors Equipeped with Ohmic Contacts; Feb. 9, 1998; http://urila.tripod.com/dcte.htm; 4 pgs.
McGregor, D.S. et al; Single Charge Carrier Type Sensing with a Parallel Strip Pseudo-Frisch-Grid CdZnTe Semiconductor Radiation Detector; Applied Physics Letter, vol. 72, No. 7; Feb. 16, 1998; 4 pgs.
McNeil, W.J. et al; Single-Charge-Carrier-Type Sensing with an Insulated Frisch Ring CdZnTe Semiconductor Radiation Detector; Applied Physics Letter, vol. 84, No. 11; Mar. 15, 2004; 3 pgs.
Prettyman, Thomas H. et al.; Characterization of a Large-Volume, Multi-Element CdZnTe Detector; http://www.nis5.lanl.gov/; 10 pgs.

* cited by examiner

Primary Examiner—David P. Porta
Assistant Examiner—Mindy Vu
(74) Attorney, Agent, or Firm—The Small Patent Law Group; Dean D. Small

(57) ABSTRACT

A method of detecting ionizing radiation is provided. The method includes detecting ionizing radiation using a detector assembly having a pixelated semiconductor substrate, each pixel including a central region and a region of variable response, each pixel further including at least one anode, the detector assembly including a grid electrode coupled to a first surface of the semiconductor substrate such that the grid electrode circumscribes the central region of at least one pixel anode, the detector assembly further including a cathode coupled to a second surface of the semiconductor substrate, the method comprising, measuring a first signal between the at least one pixel anode and the cathode wherein the anode is electrically biased with respect to the cathode, measuring a second signal between the grid electrode and the cathode wherein the grid electrode is electrically biased with respect to the cathode, combining the magnitude of the first signal and the magnitude of the second signal to obtain a total signal from the semiconductor substrate, and outputting the total signal.

22 Claims, 3 Drawing Sheets

METHOD AND APPARATUS OF DETECTING IONIZING RADIATION

BACKGROUND OF THE INVENTION

This invention relates generally to imaging systems using pixilated detectors, and more particularly to pixilated semiconductor detectors in imaging systems.

Imaging devices, such as gamma cameras and computed tomography (CT) imaging systems, are used in the medical field to detect radioactive emission events emanating from a subject, such as a patient and to detect transmission x-rays not attenuated by the subject, respectively. An output, typically in the form of an image that graphically illustrates the distribution of the sources of the emissions within the object and/or the distribution of attenuation of the object is formed from these detections. An imaging device may have one or more detectors that detect the number of emissions, for example, gamma rays in the range of 140 keV, and may have one or more detectors to detect x-rays that have passed through the object. Each of the detected emissions and x-rays is typically referred to as a "count," but the detected emissions may also be counted together as a 'signal current'. The detector also determines the number of counts received at different spatial positions. The imager then uses the count tallies to determine the distribution of the gamma sources and x-ray attenuators, typically in the form of a graphical image having different colors or shadings that represent the processed count tallies.

A pixilated semiconductor detector, for example, fabricated from cadmium zinc telluride (CZT), may provide an economical method of detecting the gamma rays and x-rays. However, a low energy tail on the energy spectrum resulting from the CZT interaction with the radiation may interfere with the ability to distinguish direct gamma rays and x-rays from gamma rays and x-rays that have scattered in the subject. The tail may result in part from a different response of the semiconductor material in the regions between the pixels. Because of intermediate surface conductivity of the semiconductor between the pixel anodes, electrons arrive late to the anode, resulting in "ballistic deficit". A low energy tail on the energy spectrum may also result from low hole mobility or trapping that causes charge integration derived from the pixel with respect to the common cathode to be incomplete.

BRIEF DESCRIPTION OF THE INVENTION

In one embodiment, a method of detecting ionizing radiation is provided. The method includes detecting ionizing radiation using a detector assembly having a pixilated semiconductor substrate, each pixel including a central region and a region of variable response, each pixel further including at least one anode, the detector assembly including a grid electrode coupled to a first surface of the semiconductor substrate such that the grid electrode circumscribes the central region of at least one pixel anode, the detector assembly further including a cathode coupled to a second surface of the semiconductor substrate, the method comprising, measuring a first signal between the at least one pixel anode and the cathode wherein the anode is electrically biased with respect to the cathode, measuring a second signal between the grid electrode and the cathode wherein the grid electrode is electrically biased with respect to the cathode, combining the magnitude of the first signal and the magnitude of the second signal to obtain a total signal from the semiconductor substrate, and outputting the total signal.

In another embodiment, an imaging system that includes a semiconductor detector is provided. The imaging system includes a pixilated semiconductor substrate responsive to ionizing radiation, the substrate including a first surface pixilated with at least one pixel anode, a grid electrode coupled to the pixilated surface, the grid electrode circumscribing a central region of the at least one pixel anode, and a cathode coupled to a second surface of the pixilated surface, the cathode substantially covering the second surface, and a controller configured to, measure a first signal between the at least one pixel anode and the cathode by applying a first bias voltage to the at least one pixel anode, measure a second signal between the grid electrode and the cathode by applying a second bias voltage to the grid electrode wherein the second bias voltage is less than the first bias voltage, and combine the magnitude of the first signal and the magnitude of the second signal to obtain a total signal from the semiconductor substrate.

In still another embodiment, a radiation detector is provided. The radiation detector includes a semiconductor substrate comprising at least one pixel anode defined in a first surface of the substrate, the at least one pixel anode configured to receive a first bias voltage, a cathode electrically coupled to a second surface of the substrate, the cathode substantially covering the substrate, a grid electrode coupled to the first surface, the grid electrode circumscribing a central region of the at least one pixel anode and configured to receive a second bias voltage, a first measurement circuit configured to measure a first signal, a second measurement circuit configured to measure a second signal, and a summing circuit configured to combine the magnitude of the output of the first measurement circuit and the magnitude of the output of the second measurement circuit, the combination proportional to a total charge in the pixel volume.

DETAILED DESCRIPTION OF THE INVENTION

Figure 1:
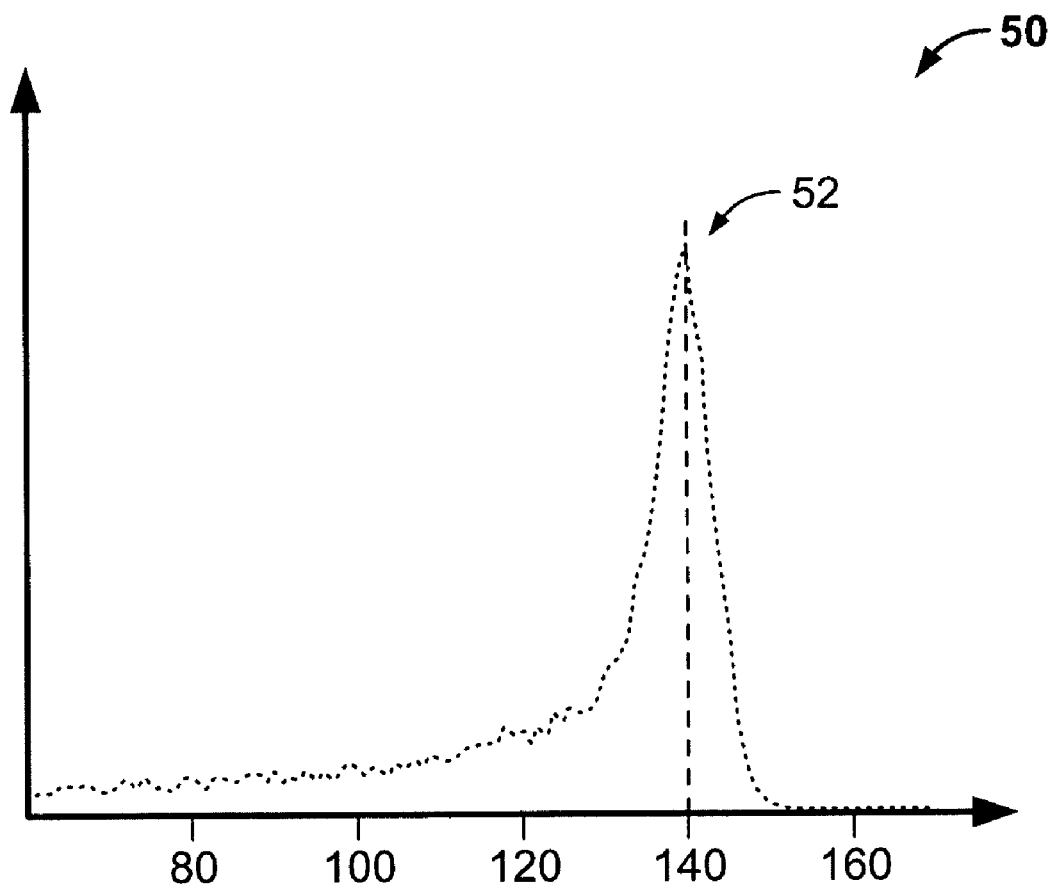
FIG. 1 is a graph that illustrates an exemplary energy spectrum of a single pixel of a pixilated CZT detector exposed to substantially unscattered 140 keV gamma rays.

FIG. 1 is a graph 50 that illustrates an exemplary energy spectrum of a single pixel of a pixilated CZT detector exposed to substantially unscattered 140 keV gamma rays. Graph 50 includes an x-axis graduated in units of keV and a y-axis representative of an amount of total counts or count rate observed at each keV level. An energy spectrum peak 52 centered about 140 keV represents the gamma rays that have been absorbed substantially within a central region portion of a single pixel. The distribution of signal amplitudes of these events is approximately Gaussian. However, a significant number of gamma rays are also detected in the portion of the energy response spectrum that tails toward the lower energies. This tail effect is caused, in part, by Compton scattering, by gamma ray absorption events that do not confine all charge creation to within a single pixel and by non-ideal charge collection. Because the illustrated response function represents the distribution of measured signals from only a single pixel, charge that is lost from the pixel and shared with adjacent pixels is not included in the response function. As a result, gamma ray absorption events in which the charge collection is incomplete due to less than ideal charge collection, such as, charge sharing with other pixels, are lost from the peak region and contribute to the low energy tailing.

Figure 2:
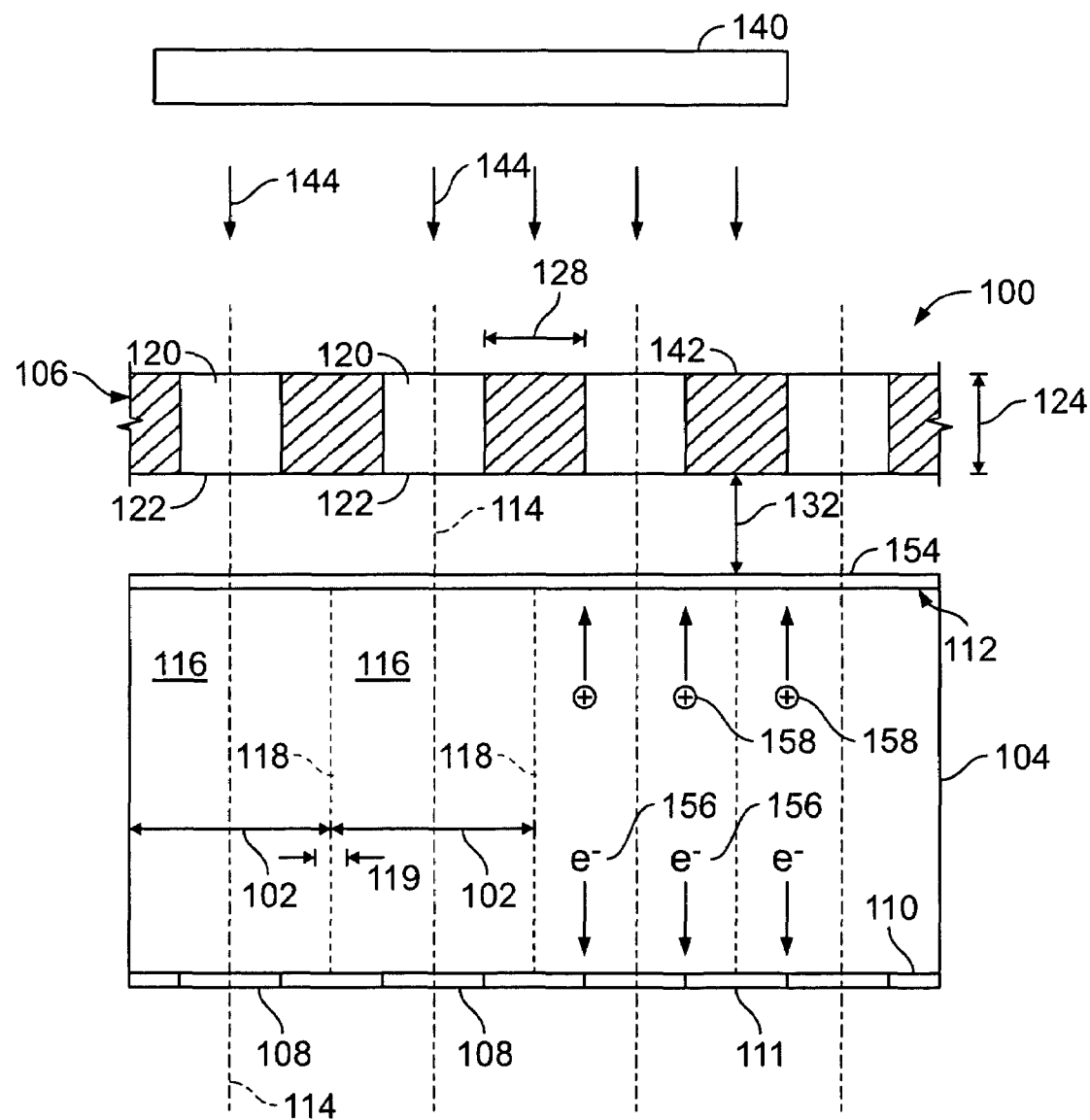
FIG. 2 is a cross-sectional view of an exemplary radiation detector having a plurality of pixilated semiconductor detector elements.

FIG. 2 is a cross-sectional elevation view of an exemplary imaging device detector 100 and includes a plurality of pixilated semiconductor detector elements 102 that may be used in connection with, for example, localizing a radiation interaction event in the detector. Detector 100 includes a detector substrate 104. Detector 100 may be formed of a radiation responsive semiconductor material, for example, cadmium zinc telluride (CZT) crystals. Detector elements 102 may be formed of the substrate 104 by pixelating a corresponding plurality of pixel electrodes coupled to a first surface 110 of detector substrate 104 (shown as a lower surface). A cross-sectional size and shape of detector elements 102 and a spacing between each of the detector elements 102 facilitates determining a location and size of each pixilated detector element 102. Specifically, each pixilated detector element 102 is located proximate a second surface 112 (shown as an upper surface) of detector substrate 104 in substantial alignment with a longitudinal axis 114 of a corresponding pixel electrode 108. Each pixilated detector element 102 includes a central region 116, bounded by useful limits 118, defining an operating portion, and a region of variable response 119. Central region 116 and region of variable response 119 extend substantially from surface 110 to surface 112. In the exemplary embodiment, a grid electrode 111, having a substantially planar body is positioned to circumscribe central regions 116.

Within central region 116, pixilated detector element 102 has a substantially uniform and repeatable response characteristic to radiation incident on second surface 112. Detector substrate 104 includes region of variable response 119 in areas outside central region 116. Region of variable response 119 exhibits a response characteristic to radiation that may be inconsistent or variable. An intrinsic spatial resolution of detector 100 may be defined by the size of and the spacing between each pixilated detector element 102. Because pixilated detector elements 102 may be non-homogeneous in response and because central region 116 has a substantially uniform and repeatable response characteristic, collimator 106 may be formed to allow gamma and x-ray photons to interact with central region 116 and to block gamma and x-ray photons from reaching region of variable response 119.

In operation, photons 144, for example emission gammas and transmission x-rays, from a source 140 are directed towards second surface 112. Photons 144 pass between collimator septa 120 and exit collimator aperture 122 Second surface 112 may be substantially covered by a relatively thin single cathode electrode 154. First surface 110 has an array of small, between about one millimeters squared (mm²) and about ten mm², generally square pixel electrodes 108 configured as anodes. A voltage difference applied between pixel electrodes, anode 108 and cathode 154 during operation generates an electric field in substrate 104. The detector field may be, for example, about one kilovolts per centimeter to about five kilovolts per centimeter. Although pixel electrodes 108 are described in the exemplary embodiment as being generally square like the pixel, it should be understood that this exemplary shape is not limiting in other embodiments, in that other shapes of pixel electrodes 108 are contemplated.

When a photon is incident on substrate 104, it generally loses all its energy in substrate 104 by ionization and leaves pairs of mobile electrons 156 and holes 158 in a small localized region of substrate 104. As a result of the detector field, holes 158 drift toward cathode 154 and electrons 156 drift toward pixel electrodes 108, thereby inducing charges on pixel anodes 108 and cathode 154. The induced charges on pixel electrodes 108 are detected and identify the time at which a photon was detected, how much energy the detected photon deposited in the substrate 104 and where in the substrate 104 the photon interaction occurred. To facilitate optimum detection of gamma and x-ray photons, central region 116 should be in substantial alignment with apertures 122 and the relative dimensions of gap 132, length 124, aperture 122 and thickness 128 should be determined such that photons arriving at incident surface 142 are absorbed in collimator 106 or central region 116.

Figure 3:
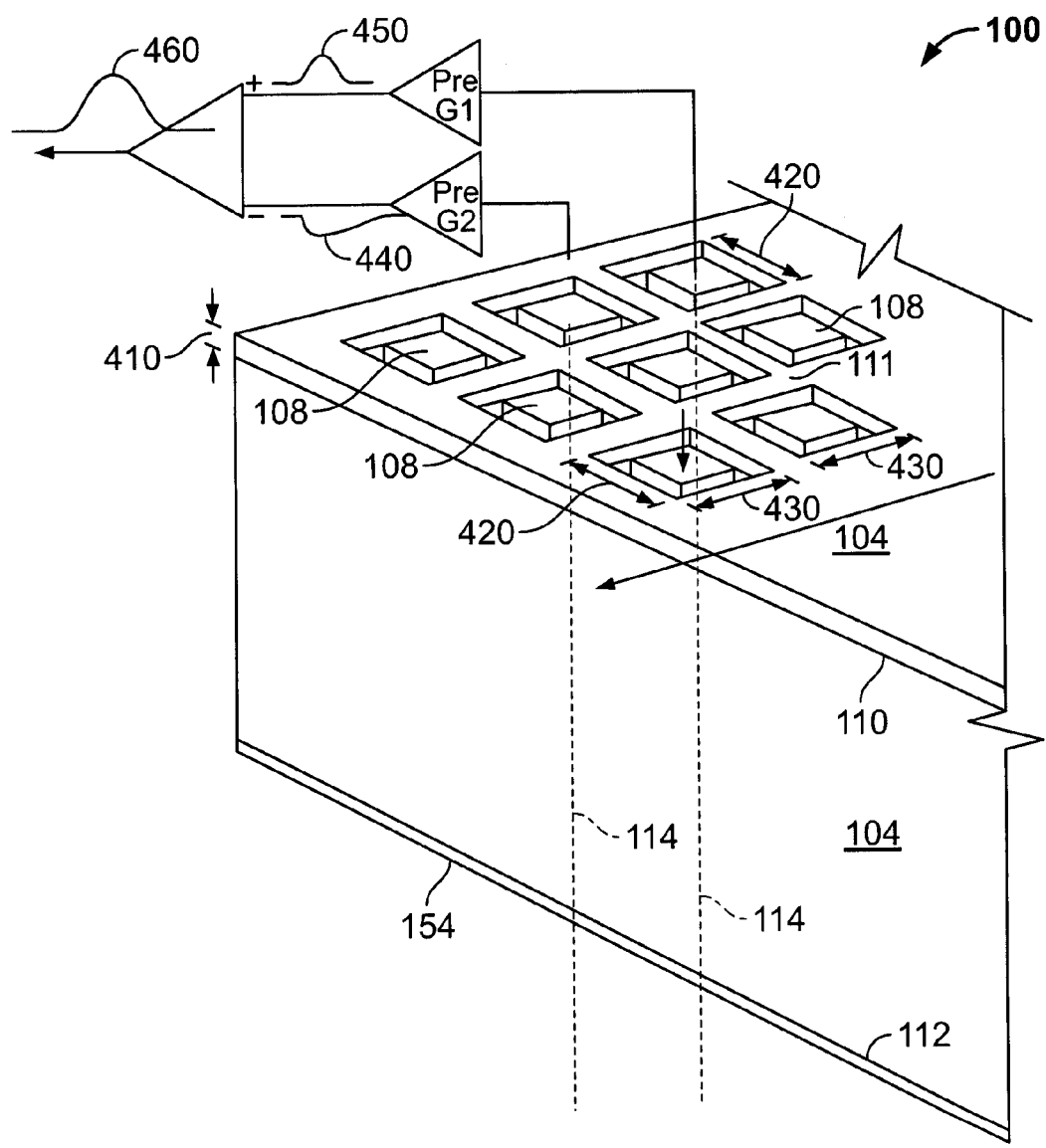
FIG. 3 is a perspective view of an exemplary radiation detector including a plurality of anodes and a grid electrode surrounding the plurality of anodes.

FIG. 3 is a perspective view of an exemplary view of the present invention. Imaging device detector 100 includes detector substrate 104 with high voltage cathode 154 covering substantially the entire second surface 112. In the exemplary embodiment, grid electrode 111, having apertures of width 420, length 430, and thickness 410 is placed to circumscribe the central regions of pixel anodes 108. Grid electrode 111 has applied to it a potential which is slightly lower than the potential of pixel anodes 108 that may be at 0.0 volts.

Applying a negative voltage to grid 111 has the effect of steering electrons 156 from region of variable response 119 and directly to anodes 108, thereby reducing the ballistic deficit. Applying (negative) voltage to grid 111 also has the effect of steering electrons from grid 111 to pixel electrodes 108, thereby separating the hole and electron signal induction on the two electrodes, 108 and 111.

Applying voltage to grid 111 thus has the effect of measuring trapped signal by electromagnetic induction. According to the Ramo's Theorem, signal induced on the pixel electrode is proportional to the distance that the charge carrier transits. A charge that transits half the total distance, for instance, will induce half the available signal in the pixel. However, applying a slight bias voltage to grid electrode 111 cause the induction of signal 440 by electromagnetic induction that is equal and opposite to the missing charge trajectory. Combining the magnitude value from grid electrode 111 to that measured 450 from anodes 108 results in a corrected signal 460 from moving electrons 156 and holes 158, and those that have not been measured by direct means because of lost mobility. The combination is made with amplifier gain coefficient G1 and G2 that are adjusted empirically for details of the electrode shapes 108 and 111.

Following is an exemplary calculation for correcting the signal as described:

| | |
|---|---|
| Electron charge = | E |
| total area of pixel anodes in a module = | AP |
| area of grid = | AG |
| area of grid proportion (per pixel) | R = AG/(AG + AP) |
| CZT slab thickness = | t |
| gamma is absorbed at depth | d |
| 'work function for CZT' | W = 4.5 eV/e |
| $\gamma$ energy for $Tc^{99m}$ | $E\gamma$ = 140 keV |
| Absorption gives charge | q = $E\gamma$/W = 31 ke |
| Ramo's theorem gives electron induction on hit anode: | E = q(t − d)/t |
| Hole Induction on anode plane | H = −qd/t |
| Hole induction on grid | GH = (−qd/t)/R |
| Output of Pre-1 (450) | P1 = G1 E |
| Output of Pre-2 (440) | P2 = G2 GH |
| Output of Op-amp | O = P1 − P2 = (G1 E) − (G2 GH) = G1 (q(t − d)/t) − (G2/R) (−qd/t) |

The noise contribution can be calculated to optimize the grid size. Following is a sample calculation. For a typical preamp (e.g. Ortec 142C), the RMS noise Referred To Input (rti) for input C=2 nF is N≈7.5 ke.

| | |
|---|---|
| Noise goal (RMS) | N = 3% for $Tc^{99m}$ |
| Grid Capacitance | GC = (C/N) 0.03 Eγ = 250 pF |
| Pixel Capacitance (measured on sample) | PC = 3 pF |
| Optimum Grid Size | GS = GC/PC = 82 pixels = 9 × 9 pixels |

Because modules are presently made of slabs of 8 × 8 pixels, this is a convenient size.

The above-described imaging device detectors provide a cost-effective and reliable means for examining a patient. More specifically, the imaging system includes a grid electrode circumscribing the central regions of all anodes which is held at a potential slightly lower than the pixel anodes. When read out together, the problems of ballistic deficit and low charge mobility are corrected, thereby yielding full performance of the detector.

An exemplary embodiment of pixilated photon detector methods and apparatus are described above in detail. FIG. 3 shows square anodes and grid openings but is not limited to square elements nor to the absolute or relative sizes illustrated. For example, round or oblong anodes and grid features and smaller or larger electrodes and/or grid openings may be used to facilitate reducing electric field emissions at sharp and/or corner features or different relative inductions.

The pixilated photon detector components illustrated are not limited to the specific embodiment described herein, but rather, components of each pixilated photon detector and the gridded anode may be utilized independently and separately, or repetitively from other components described herein. For example, the pixilated photon detector components described above may also be used in combination with different imaging systems and grid 111 and related structures, G2 are reduced in size to surround one or more pixel electrodes and is then repeated for each grouping. A technical effect of the embodiment of the systems and methods described herein include improving the semiconductor detector response energy spectrum by reducing the characteristic tail of the response by reducing the effect of ballistic deficit and by measuring, by electromagnetic induction, charges stuck in the detector material due to poor charge mobility.

While the invention has been described in terms of various specific embodiments, those skilled in the art will recognize that the invention can be practiced with modification within the spirit and scope of the claims.

What is claimed is:

1. A method of detecting ionizing radiation using a detector assembly having a pixelated semiconductor substrate, each pixel including a central region and a region of variable response, each pixel further including at least one anode, the detector assembly including a grid electrode coupled to a first surface of the semiconductor substrate such that the grid electrode circumscribes the central region of at least one pixel anode, the detector assembly further including a cathode coupled to a second surface of the semiconductor substrate, the method comprising;
    measuring a first signal between the at least one pixel anode and the cathode wherein the anode is electrically biased with respect to the cathode;
    measuring a second signal between the grid electrode and the cathode wherein the grid electrode is electrically biased with respect to the cathode;
    combining the magnitude of the first signal and the magnitude of the second signal to obtain a total signal from the semiconductor substrate; and
    outputting the total signal.

2. A method of detecting ionizing radiation in accordance with claim 1 wherein the semiconductor substrate includes a plurality of pixel anodes formed on the surface of the semiconductor substrate, a size and a location of the at least one pixel anode defines a size and location of the respective pixel.

3. A method of detecting ionizing radiation in accordance with claim 1 wherein the at least one anode is biased with respect to the cathode with a first bias voltage difference and the grid electrode is biased with respect to the cathode with a second bias voltage difference and wherein the second bias voltage is less than the first bias voltage.

4. A method of detecting ionizing radiation in accordance with claim 3 wherein the at least one anode is maintained at about 0.0 Volts, the grid electrode is biased to a first negative voltage, and the cathode is biased to a second negative voltage wherein the second negative is more negative than the first negative voltage.

5. A method of detecting ionizing radiation in accordance with claim 1 wherein measuring a first signal comprises measuring the total electron charge in the pixel electrode.

6. A method of detecting ionizing radiation in accordance with claim 1 wherein measuring the second signal comprises measuring at least a portion of the total hole charge in the pixel.

7. A method of detecting ionizing radiation in accordance with claim 6 wherein measuring the total charge comprises measuring of electromagnetic induction of the hole charge.

8. An imaging system comprising a semiconductor detector, said imaging system comprising:
    a pixilated semiconductor substrate responsive to ionizing radiation, said substrate including a first surface pixilated with at least one pixel anode, a grid electrode coupled to said pixilated surface, said grid electrode circumscribing a central region of the at least one pixel anode, and a cathode coupled to a second surface of said pixelated surface, said cathode substantially covering said second surface; and
    a controller configured to;
        measure a first signal between said at least one pixel anode and said cathode by applying a first bias voltage to said at least one pixel anode;
        measure a second signal between said grid electrode and said cathode by applying a second bias voltage to said grid electrode wherein said second bias voltage is less than said first bias voltage; and
        combine the magnitude of the first signal and the magnitude of the second signal to obtain a total signal from the semiconductor substrate.

9. An imaging system in accordance with claim 8 wherein the at least one anode is maintained at about 0.0 Volts, the grid electrode is biased to a first negative voltage, and the cathode is biased to a second negative voltage wherein the second negative is more negative than the first negative voltage.

10. An imaging system in accordance with claim 8 wherein said pixilated semiconductor substrate is responsive to at least one of emission gamma photons and transmission x-ray photons.

11. An imaging system in accordance with claim 8 wherein said pixilated semiconductor substrate comprises cadmium zinc telluride (CZT).

12. An imaging system in accordance with claim 8 wherein the first signal is indicative of a total electron charge in said pixel electrode.

13. An imaging system in accordance with claim 8 wherein the second signal is indicative of a total hole charge in said pixel.

14. An imaging system in accordance with claim 13 wherein said second signal is indicative of the hole charge induced by electromagnetic induction.

15. A radiation detector, comprising:
- a semiconductor substrate comprising at least one pixel anode defined in a first surface of said substrate, said at least one pixel anode configured to receive a first bias voltage;
- a cathode electrically coupled to a second surface of said substrate, said cathode substantially covering said substrate;
- a grid electrode coupled to said first surface, said grid electrode circumscribing a central region of said at least one pixel anode and configured to receive a second bias voltage;
- a first measurement circuit configured to measure a first signal;
- a second measurement circuit configured to measure a second signal; and
- a summing circuit configured to combine the magnitude of the output of the first measurement circuit and the magnitude of the output of the second measurement circuit, the combination proportional to a total charge in the pixel.

16. A radiation detector in accordance with claim 15 wherein said second bias voltage is less than said first bias voltage.

17. A radiation detector in accordance with claim 15 wherein said substrate comprises Cadmium Zinc Telluride (CZT).

18. A radiation detector in accordance with claim 15 wherein said first signal is indicative of a total electron charge measured in the at least one pixel anodes.

19. A radiation detector in accordance with claim 15 wherein said second signal is indicative of a total hole charge measured in the at least one pixel.

20. A radiation detector in accordance with claim 19 wherein said total hole charge measured is induced by electromagnetic induction.

21. A radiation detector in accordance with claim 15 wherein said at least one pixel anode is substantially round.

22. A radiation detector in accordance with claim 15 wherein said at least one pixel anode is substantially adapted to the pixel shape.

* * * * *